(Model.)

A. A. WHITLEY.
CHAIN CLIP FOR CLOTH STRETCHING MACHINES.

No. 503,301. Patented Aug. 15, 1893.

3 Sheets—Sheet 1.

Witnesses
George Baumann
James Gracie

Inventor
Alfred A. Whitley
By his Attorneys
Howson and Howson (Model.)

A. A. WHITLEY.
CHAIN CLIP FOR CLOTH STRETCHING MACHINES.

No. 503,301. Patented Aug. 15, 1893.

3 Sheets—Sheet 3.

Witnesses
George Baumann
James Gracie

Inventor
Alfred A. Whitley
By his Attorneys
Howson and Howson

UNITED STATES PATENT OFFICE.

ALFRED A. WHITLEY, OF BURY, ENGLAND.

CHAIN-CLIP FOR CLOTH-STRETCHING MACHINES.

SPECIFICATION forming part of Letters Patent No. 503,301, dated August 15, 1893.

Application filed February 17, 1893. Serial No. 462,771. (Model.) Patented in England February 17, 1890, No. 2,529.

*To all whom it may concern:*

Be it known that I, ALFRED AUSTIN WHITLEY, engineer, a subject of the Queen of Great Britain and Ireland, residing at Park View, Walmersley Road, Bury, in the county of Lancaster, England, have invented certain Improvements in Clips for Cloth-Stretching Machines, (for which I have obtained a patent in Great Britain, No. 2,529, dated February 17, 1890,) of which the following is a specification.

My invention relates to clips or holders employed in machines for stretching and finishing woven fabrics in which the fabric is carried by an endless chain of clips which engage the fabric at its selvages, and it consists of certain improvements hereinafter described whereby the action of the clips is more reliable and the fabric is relieved of or prevented from receiving undue pressure or strain before being engaged at its selvages by the gripping jaws of the clips.

Figure 1:
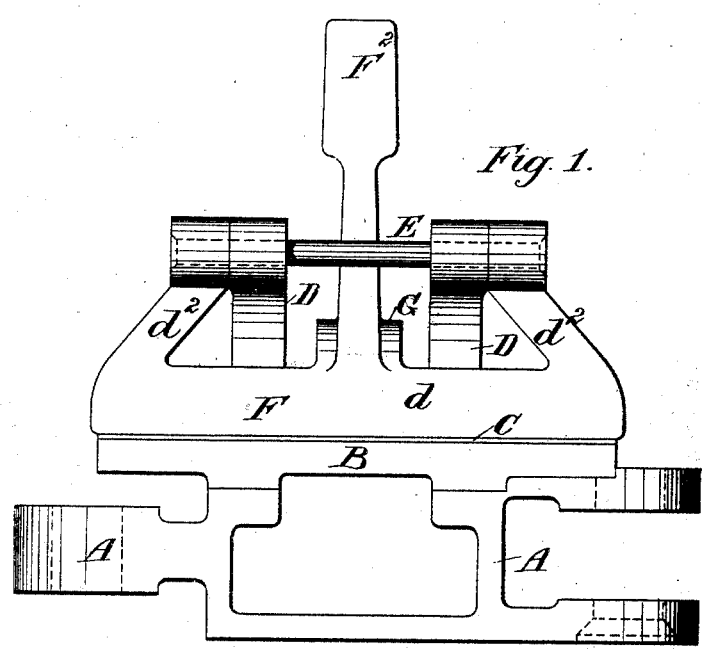
Figure 2:
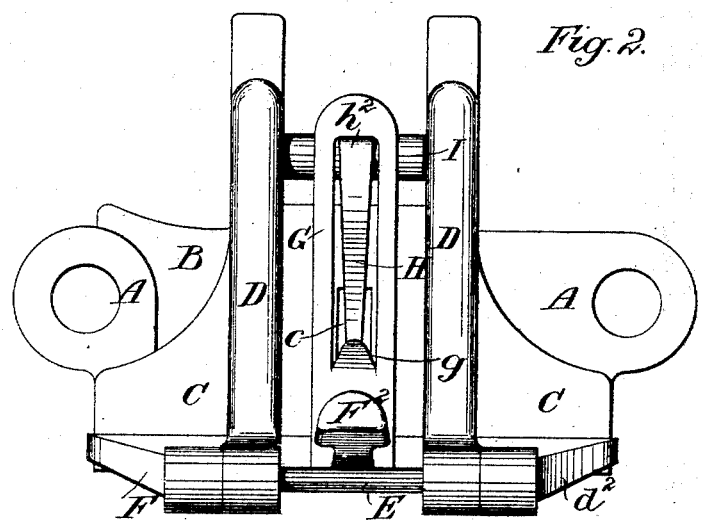
Figure 3:
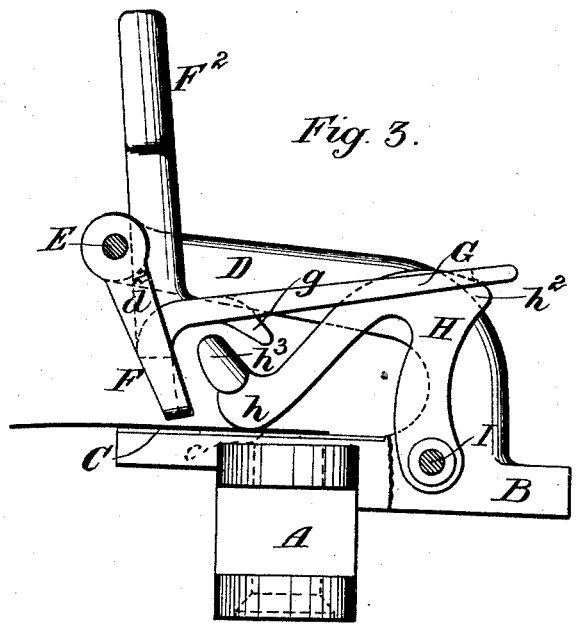
Figure 4:
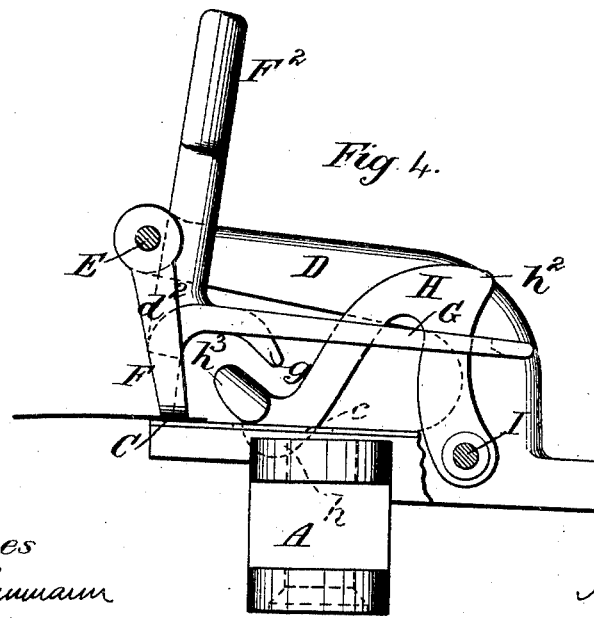
Figure 5:
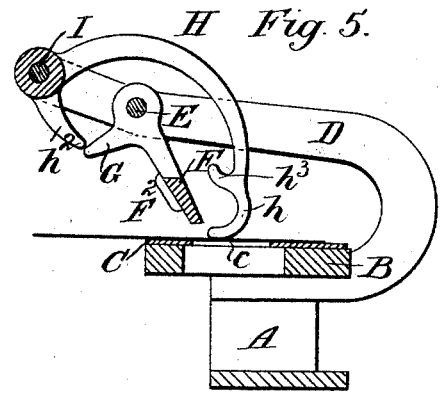
Figure 6:
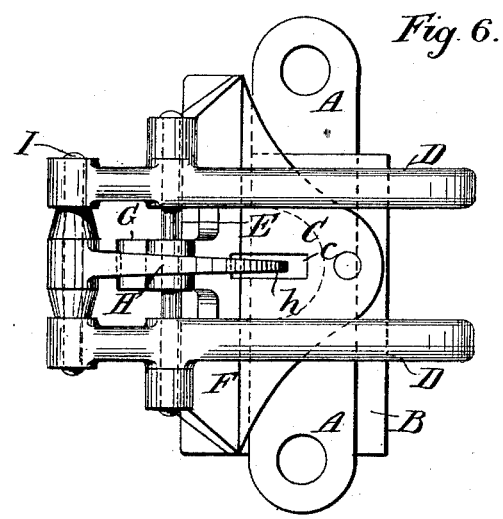
Figure 7:
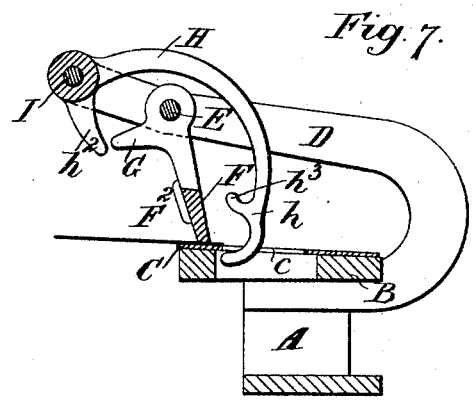

I will describe my invention with reference to the accompanying drawings, Figure 1 of which represents in side elevation one link of an endless chain provided with a clip or holder constructed according to my invention. Fig. 2 is a plan of the same. Fig. 3 is an end elevation with one of the arms D cut out to better show the jaws of the clip which are shown open and Fig. 4 is a similar view showing the jaws of the clip closed and holding the fabric. Fig. 5 is a sectional elevation showing a modified arrangement of the operating parts of the clip, the jaws being shown open. Fig. 6 is a plan corresponding to Fig. 5 and Fig. 7 is a sectional elevation similar to Fig. 5 showing the jaws of the clip closed and gripping the fabric between them.

A represents one of the links of an endless chain which carry the clips. Formed in one with the link A or secured thereto by rivets or otherwise is a bracket B to which is riveted or otherwise secured a slotted plate C constituting the lower jaw of the clip or holder.

Fitted to or formed on the bracket B are arms D carrying a pin or rod E on which is suspended the upper jaw F of the clip. The upper jaw consists of a bar $d$ provided with arms $d^2$ by which it is suspended on the rod E and is provided with an arm G which bears on a lever H to maintain the jaw F out of action until it is required to grip the fabric. The lever H is pivoted at I to the arms D or to the bracket B carrying them, the free end $h$ of the said lever being just over the slot $c$ in the lower jaw C into which slot it enters when there is no fabric between the slot and the lever. When the fabric is placed in the machine the edge or selvage thereof is passed into the clip beneath the upper jaw and past the slot $c$ in the lower jaw to the rear end $h$ of the lever H. The end $h$ then bears on the fabric within the selvage the upper jaw of the clip being held out of contact with the fabric by the arm G resting on the bail $h^2$ of the lever H as shown in Fig. 3. The pressure of the arm G on the bail $h^2$ of the lever H counterbalances the weight of the free end $h$ of the said lever so that it will bear lightly on the fabric but with just sufficient pressure to overcome friction of the end $h$ on the fabric and so prevent fragile or stiffened fabrics from being injured while being stretched.

For stretching heavy fabrics the counter balancing of the lever H is not essential, the fabric being sufficiently strong to support the weight of the lever, which lever is then employed for holding the jaws open. Immediately the selvage of the fabric passes from beneath the bearing surface of the lever H, the end of the said lever being now unsupported enters the slot $c$ in the lower jaw C, the tail $h^2$ of the lever at the same time disengaging the arm G on the jaw F, which then falls by its own gravity and grips the selvage of the fabric as shown in Fig. 4. The jaw F when gripping the fabric is inclined backward from its fulcrum E, so that its grip will be firmer as the strain or pull on the fabric increases. The jaw F is provided with a projection $F^2$ or other suitable device which may be acted on by any well known or suitable appliance on the machine to raise the jaw F at the required time to release the fabric. When the jaw is being raised it comes into contact with a lug or projection $h^3$ on the lever H so as to raise the end $h$ of the said lever out of the slot $c$, in the lower jaw into position to permit of the fabric being passed beneath it, and at the same time bring the tail $h^2$ of the lever into position to be engaged by the arm G as hereinbefore described. On the under side of the arm G is a projection $g$ to prevent the lever H from turning too far on its fulcrum when the jaw F is raised by the device on the machine.

In the arrangement shown in Figs. 5, 6 and 7, the fulcrum of the lever H is situated in front of instead of at the rear of the upper jaw as in the arrangement described. The upper jaw F is held open by the projection or tail $h^2$ of the lever H, bearing upon the arm G, the weight of the jaw serving to counterbalance the lever H as in the arrangement illustrated by Figs. 1, 2, 3, and 4.

I am aware that grippers for use in fabric stretching machines have been made with a slotted stationary jaw, and a movable jaw, the movable jaw having thereon a projection to bear on the fabric, and when the fabric is drawn from beneath this projection, the said projection enters the slot in the stationary jaw so as to allow the movable jaw to descend and grip the fabric. I therefore make no claim thereto, but

What I claim is—

1. A chain clip having a slotted stationary jaw, a movable jaw, and a lever to rest on the edge of the fabric above the slot in the stationary jaw and support the movable jaw to hold it out of action as long as the lever rests on the fabric, the said movable jaw bearing on the said lever to counterbalance the weight of the lever on the fabric, but free to close on the stationary jaw when the fabric is withdrawn from the said lever, substantially as set forth.

2. A chain clip having a slotted stationary jaw and a movable jaw provided with an arm G, in combination with a lever having a free end $h$ adapted to rest on the edge of the fabric above the slot in the stationary jaw, and provided with a tail $h^2$ with which the said arm G engages to counterbalance the weight of the free end $h$, the said tail $h^2$ maintaining the movable jaw out of action so long as the lever rests on the fabric, substantially as set forth.

3. A chain clip having a slotted stationary jaw and a movable jaw provided with an arm G, in combination with a lever having a free end $h$ adapted to rest on the edge of the fabric above the slot in the stationary jaw, the said lever being provided with a tail $h^2$ with which the said arm G engages to counterbalance the weight of the free end $h$, the said tail $h^2$ maintaining the movable jaw out of action so long as the said lever rests on the fabric, the said lever being also provided with a projection $h^3$ with which the said movable jaw engages, all substantially as and for the purposes set forth.

4. A chain clip having a slotted stationary jaw and a movable jaw provided with an arm G, in combination with a lever having a free end $h$ adapted to rest on the edge of the fabric above the slot in the stationary jaw, the said lever being provided with a tail $h^2$ with which the said arm G engages to counterbalance the weight of the free end $h$, the said tail $h^2$ maintaining the movable jaw out of action so long as the said lever rests on the fabric, the said lever being also provided with a projection $h^3$ with which the movable jaw engages, and a projection $g$ on the movable jaw to prevent the lever from turning too far on its pivot, all substantially as and for the purposes set forth.

5. In a clip or holder for use in machines for stretching and finishing woven fabrics, the combination of the lower slotted jaw C, the lever H with the lug or projection $h^3$ for the jaw F to act upon to raise the lever out of the slot $c$, in the jaw C, and the projection $g$ on the arm G to prevent the lever from turning too far on its fulcrum, substantially as hereinbefore described.

In testimony whereof I have signed my name to this specification in the presence of two subscribing witnesses.

ALFRED A. WHITLEY.

Witnesses:
EDMUND NUTTALL,
   *Mayfield, Heywood St., Bury.*
JOHN H. HILL,
   170 *Bolton Street, Bury.*